July 21, 1936.  C. C. AGATE ET AL  2,048,365
AMUSEMENT DEVICE
Filed Dec. 4, 1933  3 Sheets-Sheet 1
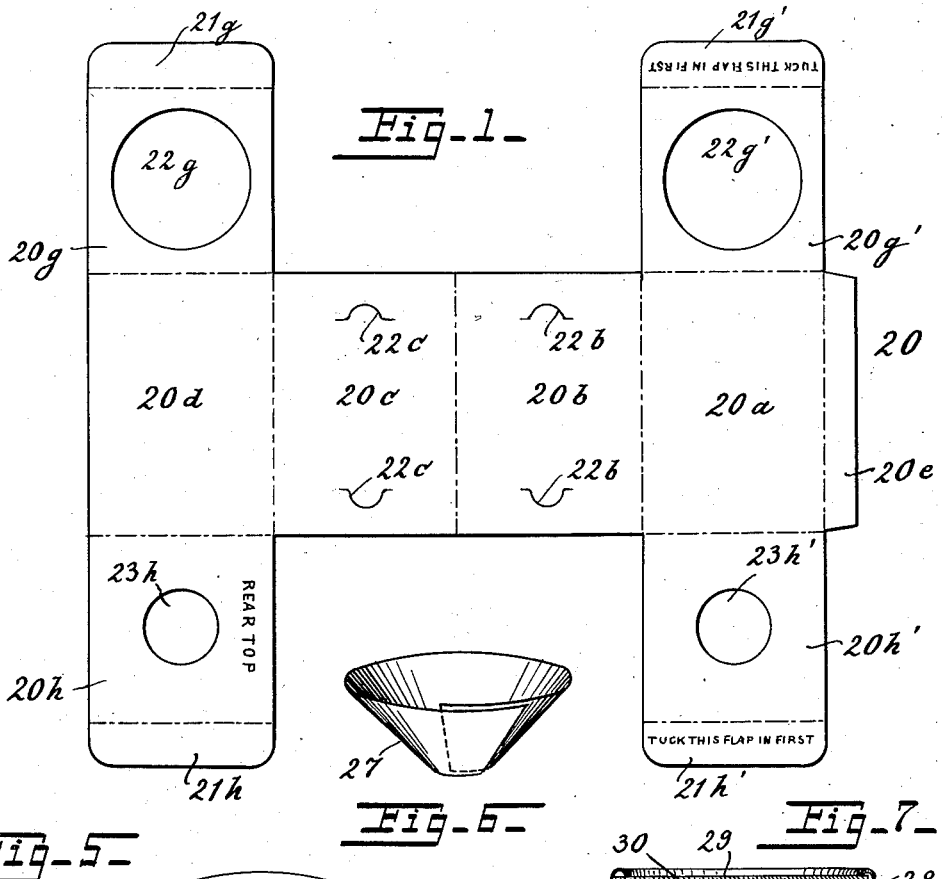
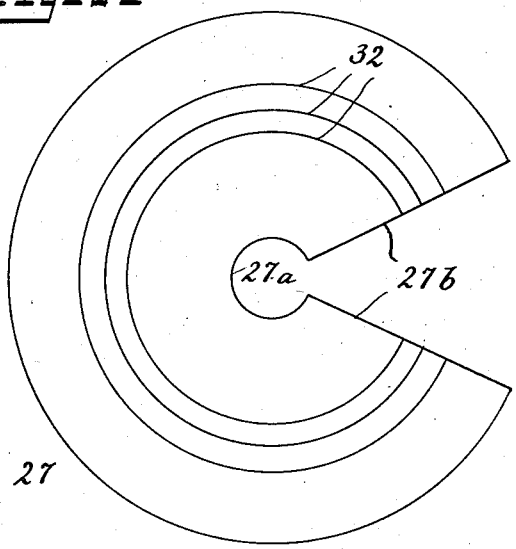
CECIL C. AGATE
MORRIS M EINSON
INVENTORS.
BY
ATTORNEYS.

July 21, 1936.  C. C. AGATE ET AL  2,048,365
AMUSEMENT DEVICE
Filed Dec. 4, 1933   3 Sheets-Sheet 2
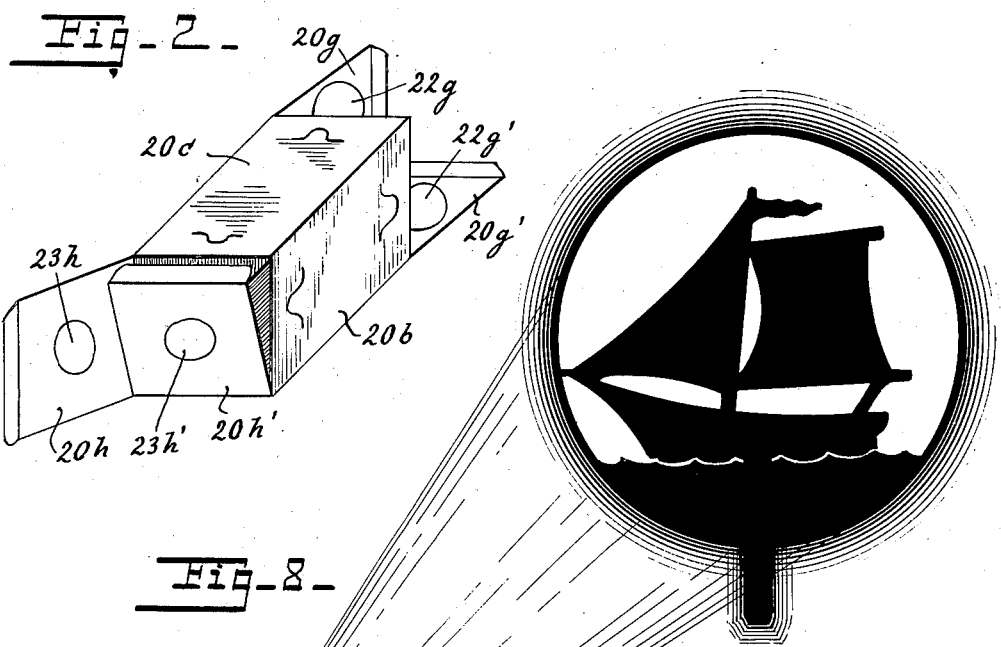
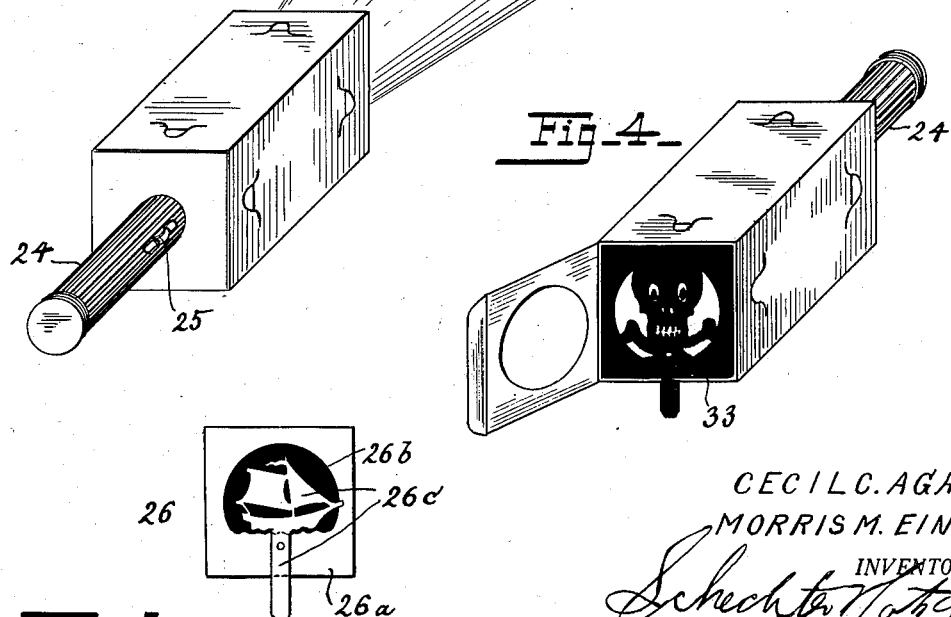
CECIL C. AGATE
MORRIS M. EINSON
INVENTORS
BY
ATTORNEYS.

July 21, 1936.  C. C. AGATE ET AL  2,048,365
AMUSEMENT DEVICE
Filed Dec. 4, 1933   3 Sheets-Sheet 3
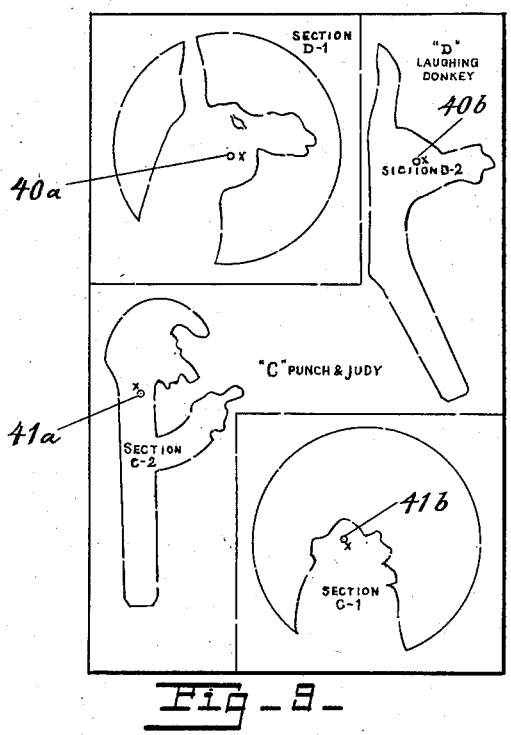
Fig-9-
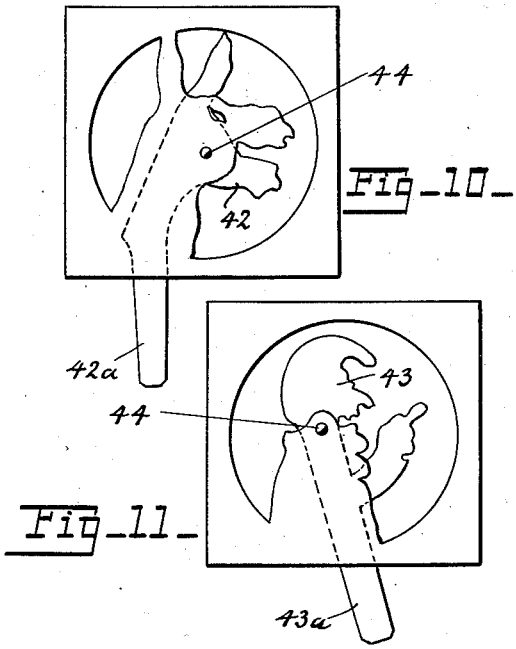
Fig-10-
Fig-11-
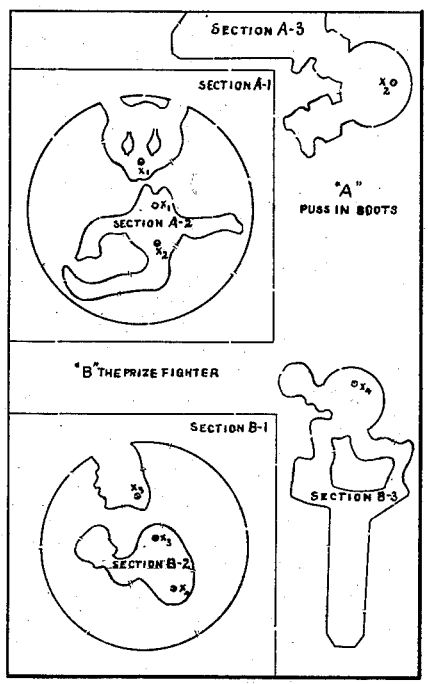
Fig-12-
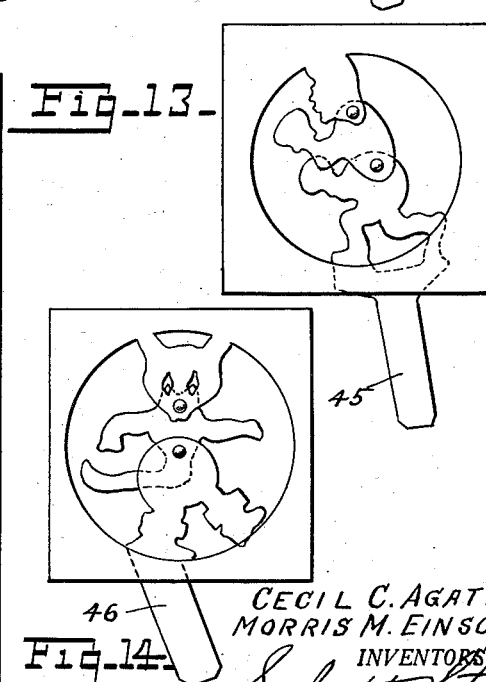
Fig-13-
Fig-14-
CECIL C. AGATE
MORRIS M. EINSON
INVENTORS
BY
ATTORNEYS.

Patented July 21, 1936

2,048,365

UNITED STATES PATENT OFFICE 2,048,365

AMUSEMENT DEVICE

Cecil C. Agate, Orange, N. J., and Morris M. Einson, Yonkers, N. Y., assignors to Einson-Freeman Co., Inc., a corporation of New York Application December 4, 1933, Serial No. 700,778

3 Claims. (Cl. 88—26)

This invention relates to improvements in what was originally known as a magic lantern, or "solar camera", and in particular to one species which is properly called "sciascope"; that is, a device which produces the "visual conception of shadows."

The principle of construction for such solar or magical lanterns is that within a box of opaque material, which has an aperture in the front side, there is provided a source of light hidden from outside view and adapted to throw its rays only through the aforesaid aperture. Across this aperture can be removably and interchangeably exposed a variety of lantern slides or screens of different structure, material and permeability for light rays. They may be transparent or translucent or transparent in different degrees, like a photographic film negative or diapositive, and may be in black and white only, or in various colors, or finally may consist of a mechanically perforated screen of opaque material. In the latter case, the magical lantern becomes a so-called "sciascope", because the light rays coming from the interior of the box can pass only through the cut-outs or perforations of the screen and will therefore only project a dark shadow of the solid portions of the screen upon a wall or curtain interposed in the path of the cone of rays emanating from the front aperture. Obviously, in all cases of such cameras the bundle or cone of rays coming from the source of light traverses the screen or lantern slide and throws an enlarged picture of the latter upon any dark and solid background, the picture being a composite of lighter or darker portions, monochrome or polychrome, according to the nature of the screen. Devices based upon the principle of such cameras have found a manifold use for utilitarian, advertising or simply entertaining purposes.

The operating light may be light of natural or artificial origin and may or may not be combined with a system of lenses. In the original solar camera, used for projecting enlargements of photographic negatives upon a sensitive sheet of paper in a photographic dark room, the camera or lantern box was installed in a wall aperture of the dark room opposite a sensitive sheet supported on an easel. The sunlight from outside was conducted through a collecting lens into the box and upon the lantern slide, which, in this case, was a photographic negative. Through a second lens placed behind said negative, an enlarged, sharp picture of the negative was projected upon the sensitive sheet on the easel where by chemical action it produced a positive enlargement. From the original source of light these cameras were named "solar", though afterwards this natural illumination was replaced by an electric arc or acetylene light placed entirely inside of the camera or lantern. Various similar devices based upon the same principle have been invented. Besides the aforementioned solar camera and the usual magic lantern which uses plain colored glass pictures as screens and serves for entertaining and illustrating purposes only, the vitascope, the stereopticon, the cinematoscope and numerous other apparatus have become known which are diverse applications of the original magic lantern. While most of these devices are more or less complicated and require expensive mechanism, it is the special purpose and task of this invention to provide an inexpensive and simplified form of such magic lantern, at least in one of its elementary modifications, that of a "sciascope" which at the same time should be highly efficient, handy, entertaining and using inexpensive, modern means for illumination.

One of the objects of this invention is to provide a magic lantern which may be manufactured from very cheap material, viz: common cardboard throughout its different component parts. Another object of the invention is to provide such simplified construction of this cardboard camera or magic lantern box that any unskilled person can easily manufacture and construct it from a simple blank form without the use of special tools or even separate attaching means.

Another object of the invention is to provide the raw material in the form of a suitably cut, scored and bent blank of cardboard, ready to be set up and mounted.

A further object of the invention is to reduce the manufacturing and operating cost of such magic lantern or "sciascope" to a minimum and to make the camera construction adapted to be used in combination with one commonly available and handy source of artificial illumination, viz: any of the standard pocket flashlights, used by the public. For this very reason the inventors have chosen the appellation "flashoscope" as a fitting name for their invention.

A further object of the invention is to provide any auxiliary devices or means which may appear necessary or advantageous to make the application of a common flashlight to the camera practical and improve its efficiency.

The aforementioned objects refer to applicants' device in general, if it is considered simply as a modification of the old "magic lantern", and it should be apparent to everybody skilled in the art that such a device and combination could be used for any kinds of transparent or translucent screens or slides whether monochrome-like photographic negatives or positives or polychrome-like colored glass pictures; also either for manufacturing purposes—like photographic "solar" or so-called "carbon" enlargements, which in this style and with this outfit could be practiced with fair success by amateur photographers—or simply for entertaining purposes, like the old-fashioned magic lantern, but the following series of objects refer in particular to the use of this novel kind of magic lantern as a sciascope; that is, as a magic lantern which produces "shadow pictures".

Therefore, one other object of the invention is to provide a magic lantern of the character described and adapted to project shadow pictures by means of suitably perforated, but otherwise non-translucent, screens.

A further object of this invention is to provide means whereby said perforated, non-translucent screens can be made movable in parts, thus producing the optical illusion of moving shadows or shadows of apparently alive or moving objects.

A further object of the invention is to provide means of manually and quickly changing the subjects to be projected, respectively exchanging the sciascope screens.

It has to be observed in connection with these features of the invention that it presents in this form a mechanical modernization of a very old and favorite pastime; that is, throwing shadow silhouettes on a wall by means of a light and one or two hands in different positions and combinations, using as auxiliary objects handkerchiefs, pencils or any other paraphernalia deemed suitable. Thus the invention revives an ancient and amusing art and converts it into a novel and modern entertainment for children and grown-ups.

But, in order to further provide entertaining and instructive amusement for children, the screens to be used are presented and marketed in such a form that they can easily make them themselves and fix them up for ready use without any professional skill or use of special tools and furthermore derive from the indicated manner of manufacturing them, suggestions on how to prepare new subjects themselves with a minimum of labor and tools.

A further object of the invention is to devise a process by which the screens or lantern slides of a sciascope of the afore-described or any similar form can be manufactured in such a way as to be easily finished and assembled by any unskilled operator or amateur without the use of special tools or unusual or unavailable fastening means.

Other objects of the invention will be apparent from a consideration of the following specification taken in connection with the accompanying drawings, in which—

Fig. 1 is an illustration of a blank form, cut out and scored, ready to be assembled as a magical lantern according to the principles of this invention;

Fig. 2 shows in perspective view the blank, pasted together and in the course of being folded up into the shape of the lantern;

Fig. 3 shows the interior view of a sciascopic screen to be used in combination with the lantern;

Fig. 4 shows in perspective view the aforesaid camera folded up into finished form with the exception of the front closing flap, with a pocket flashlight inserted into the rear end of the camera and a sciascopic screen of a different design from Fig. 3, applied to the front end;

Fig. 5 shows a fragmentary paper disk to be used in combination with the reflector of the pocket flashlight, employed as an illuminating source of the camera;

Fig. 6 illustrates on a smaller scale how this disk is to be bent into a conical frustrum, in order to be inserted as a dimming shade into the concavity of the reflecting metallic mirror of the incandescent bulb of the flashlight;

Fig. 7 is a sectional view through the fragmentary upper portion of a pocket flashlight, provided with the conical dimming paper shade, illustrated in Fig. 6;

Fig. 8 is a perspective diagrammatic view illustrating the way in which a sciascopic screen (see Fig. 3) could be projected by a camera or lantern, built according to the principles of the invention, upon an unilluminated background. This illustration especially need not be accepted as limiting or restrictive, as it applies equally well to colored or moving pictures of any description;

Fig. 9 is an illustration of a sheet of cardboard, perforated in the fashion that so-called jigsaw puzzles are perforated and indicating a manner in which a sciascopic screen of any description could be manufactured from a flat piece of cardboard ready to be plucked out from a whole integral sheet and to be mounted in the manner indicated by Figs. 10 and 11;

Figs. 10 and 11 show how the sections, contained in the sheet, illustrated by Fig. 9, are assembled to serve as operative screens. While this sheet shows two different samples of sciascopic screens, each consisting of two separate portions, linked together so as to form cooperating halves, the following figures show sciascopic screens made according to the same principle to illustrate moving shadow figures, but each composed of three separate portions.

Fig. 12 accordingly shows a sheet, similar to that of Fig. 9, but each unit comprising three separate operative elements which can be combined into a moving shadow assembly, as clearly shown by Figs. 13 and 14.

Similar characters denote similar elements throughout the different views. These embodiments, exemplifying the inventive concept, are to be taken as illustrative only, as the invention is capable of a variety of modifications and mechanical expressions and is not confined therefore to the exact details shown and described.

Referring more particularly to the details of the invention, the blank 20 (Fig. 1) comprises four adjacent and aligned quadrangular portions, 20a, 20b, 20c and 20d, adapted to form the mantle of a rectangular camera with square cross-section, provided with a pasting strip 20e for an adhesive, to be permanently attached to the outer rim of 20d. The end walls of the camera are formed by double flaps of square contour, designated by 20g, 20g' and 20h, 20h' each flap being integrally attached laterally to one of the four corners of the mantle section of which the side walls are formed and on its free protruding side provided with folding strips 21g, 21g', 21h, 21h', coordinated to the above mentioned flaps in the order named. These strips do not have to be covered with adhesive but can be tugged under the edge of the opposite wall and the outer rim of the strip is inserted into one of arcuated cutouts 22b and 22c indicated at opposite ends of the wall panels 20b and 20c. Thus the end flaps, i. e., 20g and 20g' overlap each other and are securely held in place by frictional engagement with the little tongues formed by the arcuated cuts 22b and 22c as Figs. 4 and 8 indicate. In the center of these end flaps are cutout circular apertures in such a manner that each pair of overlapping flaps have congruent apertures, registering with each other, thus forming two circular end openings, one larger one 22g, g' destined for the sciascope screen and one of smaller diameter 23h, h' for inserting a flashlight 24 as will be presently explained. The centers of both openings are in the central axis of the camera. The purpose of having double end flaps is twofold; it greatly reinforces the structure of the camera, and secondly, the end flaps 20g, 20g' form a guide frame into which the lantern slides or screens can be inserted.

The pocket flashlight, which may be any of the standard (round) sizes; i. e., of 1½" diameter and 6 to 8" in over-all length, a fragmental longitudinal section through the lamp and lens portion of which is shown in Fig. 7, does not need to be described in detail, as its construction is well known and as such does not constitute a claim in this invention.

The flashlight has to be inserted from the front end; that is, through the larger opening, and its handle end is pushed through the openings 23h, h' of the rear flaps, until the head of the flashlight fits snugly against the inside of the camera rear end, as indicated in Fig. 8. The sliding switch (or push button) 25 for the lamp thus comes outside of the camera, within easy reach of the operator. If then a screen 26, such as is depicted in Fig. 3 is inserted between the two closed front flaps, the sciascope is ready for demonstration.

It will, upon trial, be found however that if one uses the common flashlight, fitted with reflector, bulb and glass top, the result is not quite satisfactory. Instead of a sharply circumscribed shadow picture, such as is shown in the projection of the strip in Fig. 8, one finds the dark shadows passing into the lighted parts through a series of lighted rings and half shadows, thus blurring the picture. Upon investigation it is found that this indeterminate illumination and lamination of lighted and shadowed outlines is caused by the reflector or rather by the overlapping of a multiplicity of projections coming from different parts of the curved reflector. To eliminate this disturbing effect and dim the excessive gloss of the reflector, we found the use of a paper disk or funnel 27, (see Fig. 6) spread over the reflector, very satisfactory and efficient. In fact, without the use of this gloss eliminator, the "flashoscope" would not be a practical device. While causing sharp outlines and contours the disk, if made of white material, will still serve as a reflecting medium to increase the luminosity of the lighted portions in the pictures. The disk or funnel 27 is made from a blank, shown in Fig. 5, which represents an annular segment, or rather a circular disk with a small round opening 27a in the center and divided by a wedge-shaped sector 27b.

This annular segment can be folded to form a frustrumed cone, as is shown in Fig. 6. After the locking ring 28 of the flashlight (see Fig. 7) and the glass top 29 has been removed, the paper cone 27 is slipped over the glass bulb 30, so as to cover the reflector 31 entirely. As the tops and reflectors of flashlights, however, are made in different sizes, this difference is taken care of by several concentric circles 32 along which the disk can be trimmed down to the proper size. The resiliency of the paper cone will spread it to form a close-fitting shade over the metal reflector, as Fig. 7 shows. It will usually not be necessary to unscrew the bulb in order to slip the inner disk rim around the base of the bulb.

The sciascope screens used can be of unlimited variety, but have certain parts in common. They can be made of paper or any other opaque and suitable material. Substantially they form flat square tablets which are inserted between the two front flaps 20g and 20g' with the large circular apertures. These screens consist of a square main plate 26a having a partially cutout circular portion 26b corresponding in outer circumference to the large circular cutouts 22g, 22g' of the front flaps. The portions spaced within this circular cutout 26b form a part of the shadow picture, as for example the base portion of the screen 26, representing the water or the upper dependent flap in the screen 33, representing the skull itself. Pivotally attached at a suitable point to this main plate is another movable member, 26c, which structurally forms a two-armed vertical lever, the upper arm forming the movable portion of the shadow picture and the lower arm a handle by which the member 26c may be moved back and forth, thus creating the illusion of a part of the shadow picture being in motion. In the screen 33 this movable portion comprises besides the handle the pupils of the eyes, the teeth and the crossed bones.

It remains to describe the method by which these sciascopic or "flashoscope" screens are manufactured, and eventually could serve as patterns for youthful amateurs to make up silhouette screens of their own imagination, cutting them out for instance from illustrations in comical magazines, etc. This affords an amusing and instructive pastime for indoor entertainment.

It is well known to perforate carboard sheets by broken contour lines, so that while the whole sheet is kept in a coherent condition when being shipped and sold, it can easily be broken apart or the separate cutouts removed from the surrounding sheet with little effort. This has been generally done within recent years with so-called jigsaw puzzles made of cardboard, and a similar method is applied in this invention to preparing sheets for sciascope screens.

But instead of a succession of short punches, closely following each other, rather long linear perforations, sparingly interrupted by narrow bridges, are used as Figs. 9 and 12 indicate, so that the finished broken-out piece will not show ragged contours, but rather smooth outlines; also that no tools need be employed.

Fig. 9 shows in reduced scale such a blank sheet, comprising the necessary parts for two different subjects: "The Laughing Donkey" and "Punch and Judy". It will be observed that all contour lines are punched right through the sheet, except at numerous points where the contour is interrupted by tiny coherent bridges of fibre left standing, which, however easily break through with hardly visible burrs. Each screen subject in this instance requires two components: one square panel D—1, or C—1 respectively and the movable member D—2, or C—2 respectively. The square panels have a partially cut out circular portion, some of its area representing part of the silhouette figure left standing. The movable members, forming irregular elongated pieces, are pivotally attached to the panels, and the corresponding pivot holes on the pieces to be fastened together, are punched out and besides this also marked with a cross, as shown at 40a, b, or at 41a, b. Any kind of split rivets or so-called McGill paper fasteners 44 can be used as pivotal connections, as Figs. 10 and 11 show. The movable members, as the assemblies show, form two armed levers, the upper arm, as far as it protrudes into the cutout portion of the square panel, being formed to represent the movable parts 42 and 43 of the silhouette figures, and the lower depending arm being shaped as a handle, projecting beyond the lower rim of the panel, to manipulate the moving members during demonstration. (See 42a and 43a).

The following blank sheet, illustrated in Fig. 12, shows the necessary parts of two other subjects: "Puss in Boots" and "The Prize Fighter" and is perforated and arranged in analogous manner as the former sheet. At the same time it shows a modification, insofar as it is composed in each instance of three component parts instead of two, one stationary square panel A—1 or B—1 respectively and a couple of movable members A—2, A—3, B—2, B—3 respectively, which, as the assemblies in Figs. 13 and 14 indicate, are linked chainlike to the first stationary members. In these instances only the end members A—3 and B—3 are provided with a handle end, viz: 45 for section A—3 and 46 for section B—3. The back and forth motion of these end members bends and rebends the middle members also in a different direction, in this way giving an imitation of an animated shadow figure. The mounting of the complete figure by two paper fasteners used as pivots can easily be seen from a contemplation of Figs. 13 and 14.

The blank sheets are advantageously blackened on one side, to increase the opaqueness as well as to prevent disturbing reflections.

It is obvious that this principle of combination and cooperation between stationary and moving parts can be easily extended and is not at all confined to the employment of one or two movable parts alone. It is for instance feasible to combine two separate characters in one picture; i. e. instead of showing the figure of "Punch" alone, represented in the second subject described, one could also show "Judy" in the same circular cutout, and both characters could have their separate moving parts with separate handles. Or one could construct a whole "Jumping Jack" with moving arms and legs and join them by a leverage system to a common handle which would have to be moved up and down to impart separate motion to both arms and legs, and this could be combined with a motion of the eyes or the mouth.

It is thus seen that all the objects listed of this improved sciascopic device are attained in a simple and inexpensive manner and that even the question of artificial illumination is solved in a very convenient way which on the one hand is available to almost any person, as the use of pocket flashlights is very common, and on the other hand opens a new market for the manufacturers of this general commodity and tends to increase the sale of flashlight batteries. I desire it understood, however, that these improvements are not confined to the particular forms shown and described, the same being merely illustrative, and that the invention can be carried out in other ways without departing from its spirit, and therefore I claim broadly the right to employ all equivalent means coming within the scope of the appended claims.

Having now described my invention, what I claim and desire to secure by Letters Patent, is:

1. A magic lantern comprising a collapsible cardboard container, a separable flashlight, and a separable slide for projection on a wall or screen, said cardboard container composed of a cardboard blank, comprising four quadrangular panels for forming the sides of the collapsible container, a plurality of end panels attached to the outer edges of the side wall panels so as to form a complete box-like structure, said end panels having folding tongue sections, slots in said side wall panels forming a receiving means for engaging and retaining said folded tongue sections when inserted into said slots for rigidly holding said collapsible cardboard container in box-like form; perforations in all of said end panels, one perforation having a diameter approximately the same diameter as the body of said flashlight, and means whereby the slide may be inserted between one of the end panels and the container, at the opposite end of the end panel containing the flashlight for projection on the wall or screen.

2. A magic lantern comprising a collapsible cardboard container, a separable flashlight, and a separable slide for projection on a wall or screen, said cardboard container composed of a cardboard blank, comprising four quadrangular panels for forming the sides of the collapsible container, additional panels attached to the outer edges of the side wall panels so as to form a complete box-like structure; perforations in all of said end panels, one perforation having a diameter approximately the same diameter as the body of said flashlight, and means whereby the slide may be inserted between one of the end panels and the container, at the opposite end of the end panel containing the flashlight, for projection on the wall or screen, said slide having a pivotally mounted arm extending from and beyond said container walls for manually manipulating said slide.

3. A magic lantern comprising a collapsible cardboard container, a separable flashlight, and a separable slide for projection on a wall or screen, said cardboard container composed of a cardboard blank, comprising four quadrangular panels for forming the sides of the collapsible container, additional end panels attached to the outer edges of the side wall panels so as to form a complete box-like structure, perforations in all of said end panels, one perforation having a diameter approximately the same diameter as the body of the said flashlight, said end panels at the opposite end of the end panel containing the flashlight, attached to the outer edges of opposite wall sections, and means whereby the slide may be inserted between said end panels in a direction outlined by the two remaining side wall sections unattached to said end panels, whereby the light from the flashlight in said end panel will be projected through the slide on the wall or screen.

CECIL C. AGATE.
MORRIS M. EINSON.